United States Patent
Harron et al.

(10) Patent No.: US 7,492,832 B2
(45) Date of Patent: Feb. 17, 2009

(54) METHOD AND APPARATUS FOR DIGITAL VECTOR QAM MODULATOR

(75) Inventors: Gerald Harron, Martensville (CA); Surinder Kumar, Victoria (CA)

(73) Assignee: Vecima Networks Inc., Victoria, British Columbia (CA)

( * ) Notice: Subject to any disclaimer, the term of this patent is extended or adjusted under 35 U.S.C. 154(b) by 1023 days.

(21) Appl. No.: 10/796,416

(22) Filed: Mar. 10, 2004

(65) Prior Publication Data

US 2005/0089117 A1    Apr. 28, 2005

Related U.S. Application Data

(60) Provisional application No. 60/513,985, filed on Oct. 27, 2003.

(51) Int. Cl.
*H04L 27/36* (2006.01)

(52) U.S. Cl. .................. 375/298; 375/261; 332/103; 332/151

(58) Field of Classification Search .......... 375/298, 375/261; 332/103, 151
See application file for complete search history.

(56) References Cited

U.S. PATENT DOCUMENTS

| | | | |
|---|---|---|---|
| 5,329,259 A | 7/1994 | Stengel et al. | |
| 5,612,651 A | 3/1997 | Chethik | |
| 5,627,500 A * | 5/1997 | Wolaver et al. | 332/112 |
| 5,659,272 A | 8/1997 | Linguet | |
| 5,714,896 A * | 2/1998 | Nakagawa et al. | 327/115 |
| 5,852,389 A | 12/1998 | Kumar et al. | |
| 5,867,071 A | 2/1999 | Chethik | |
| 6,366,177 B1 | 4/2002 | McCune et al. | |
| 6,373,902 B1 * | 4/2002 | Park et al. | 375/296 |
| 2002/0097790 A1 * | 7/2002 | Dress et al. | 375/219 |
| 2004/0037363 A1 * | 2/2004 | Norsworthy et al. | 375/259 |
| 2005/0163248 A1 * | 7/2005 | Berangi et al. | 375/296 |

* cited by examiner

*Primary Examiner*—Juan A. Torres
(74) *Attorney, Agent, or Firm*—Adrian D. Battison; Michael R. Williams; Ryan W. Dupuis

(57) ABSTRACT

Direct digital QAM modulation at an RF frequency is obtained from digitally synthesized RF signals which are generated for use as the two vectors. The two vectors are individually controlled in phase and summed to provide a combined phase and amplitude modulation that forms the modulated signal. The synthesized RF signal is generated from a higher reference frequency using a variable pulse stretching technique implemented with programmable delay lines. The amount of the pulse stretch in each cycle is controlled by a phase increment value. Pulse stretching can be extended beyond one cycle by pulse swallowing, allowing the generation of an RF signal from DC up to and including the input reference frequency. Phase modulation is added by digital control of the pulse stretching according to the phase modulation data bits.

33 Claims, 6 Drawing Sheets

FIGURE 1 - PRIOR ART

METHOD AND APPARATUS FOR DIGITAL VECTOR QAM MODULATOR

This application claims priority under 35 U.S.C. 119 from Provisional Application Ser. No. 60/513,985 filed Oct. 27, 2003.

This invention relates generally to telecommunication systems. The present invention relates more specifically to a method of synthesizing a direct QAM modulated RF signal with high power efficiency for use in telecommunication systems.

RELATED APPLICATIONS

This application is related to applications filed on the same day by the same inventors under, Ser. No. 10/796,415, entitled APPARATUS FOR FRACTIONAL RF SIGNAL SYNTHESIS WITH PHASE MODULATION and, Ser. No. 10/796,417, entitled METHOD AND APPARATUS FOR FRACTIONAL RF SIGNAL SYNTHESIS the disclosures of which are incorporated herein by reference.

BACKGROUND OF THE INVENTION

A prior art arrangement is shown and described hereinafter and has a number of disadvantages which will become apparent from the description hereinafter.

A search has revealed the following US patent references:

U.S. Pat. No. 5,329,259 Stengel, "Efficient Amplitude/Phase Modulation Amplifier"

U.S. Pat. No. 5,612,651 Chethik, "Modulating Array QAM Transmitter"

U.S. Pat. No. 5,659,272 Linguet, "Amplitude Modulation Method and Apparatus using Two Phase Modulated Signals"

U.S. Pat. No. 5,867,071 Chethik, "High Power Transmitter Employing a high Power QAM Modulator"

U.S. Pat. No. 6,366,177 McCune, "High-Efficiency Power Modulators"

U.S. Pat. No. 5,852,389 Kumar, "Direct QAM Modulator"

SUMMARY OF THE INVENTION

According to the invention there is provided an apparatus for directly generating a QAM RF signal comprising:

a high speed reference clock providing in an input signal having a series of pulses at a frequency of the reference clock which is higher than the desired output frequency;

two programmable digital delay elements each arranged to receive the reference pulses of the input reference clock and to generate therefrom using input data a respective one of two digital vectors;

and a signal combining element for receiving the digital vectors from the programmable digital delay elements and for generating the QAM RF signal therefrom.

Preferably there are provided amplifiers for amplifying the digital vectors non linearly before combining.

Preferably the programmable digital delay elements comprise high speed adders/accumulators wherein said adders/accumulators are arranged to determine the amount of delay implemented by the delay elements on the reference signal.

Preferably the output frequency is set from an increment value according to the following equation:

$$\text{Increment Value} = ((f_{ref}/f_{out}) - 1) * 2^n$$

where $f_{ref}$=Reference clock (103) frequency
$f_{out}$=Output (110) frequency
n=Number of bits in the accumulator math.

Preferably the duty cycle is set by initializing the difference of the initializing values of the two accumulators according to the following equation:

The reference clock frequency divided by the desired output frequency multiplied by $2^n$ multiplied by (p/100), where p is the percentage duty cycle and n is the number of bits in the accumulator math.

Preferably the worst case frequency resolution is determined by the equation:

The reference frequency divided by $2^n$ where n is equal to the number of bits in the accumulator.

Preferably a non-linear amplifier is used to produce a high RF output power, from the sum of two phase modulated vectors.

Preferably the duty cycle of the output can be varied by changing the difference in the start values of the accumulators for the rising and falling edge delay control.

Preferably the interpolator is a linear interpolator.

Preferably the interpolator is a (sin x)/x interpolator filter.

Preferably the need for a reconstruction filter is removed by interpolation up to the reference clock rate.

Preferably phase delay of the programmable delay is calibrated using a look up table or Microprocessor.

Preferably separate delay controls are used for producing the rising and falling edges of the output from the same input edge of the reference clock.

Preferably the reference edge of the reference clock is delayed by the programmable delay lines.

Preferably the reference edge may be either the rising or falling edge of the reference clock.

Preferably the carry bits (overflow bits) are used to control a pulse swallowing circuit to extend the delay to multi cycles of the input reference clock.

Preferably the clock swallow circuit can ignore/block multiple reference clock pulses thus giving the delay line endless delay capability.

Preferably the clock swallow circuit can be located prior to or following the programmable delay line.

Preferably a set reset flipflop is used to combine the separate rising and falling edge delays to form any desired duty cycle output.

Preferably the output duty cycle is not dependent on the input duty cycle.

Preferably increasing the number of bits in the adder math increases the frequency resolution with negligible degradation in the phase noise performance.

Preferably the number of bits of math used in the adder can be equal to or exceed the number of bits of control in lookup table and/or the programmable delay.

Preferably the speed can be increased using parallel processing in the adders, and/or accumulators.

Preferably the adders/accumulators can be implemented in a larger lookup table wherein all the answers of the pattern are pre-computed and stored.

Preferably an optional arrangement could include plurality of adders, accumulators, pulse swallow circuits, lookup tables, and programmable delay lines are used.

Preferably the lookup table has a multiple set of lookup tables to be used for temperature compensation of the programmable delay line.

Preferably the implementation is done fully digitally in an ASIC with no requirement for a voltage controlled oscillator, loop filter, or Digital to Analog converter used in prior art solutions.

Preferably an optional arrangement could include filtering of the output to produce a signal having less harmonics.

Thus the arrangement described herein pertains to a new method and apparatus to produce a fully digital QAM modulated frequency agile RF signal. It is based on the summation of two fixed amplitude digital vectors each of which is synthesized from a high fixed-frequency reference clock. Pulse stretching is used to delay each edge of the reference clock to the desired time. Clock edges are swallowed in conjunction with the delay to reproduce the clock edge that synthesizes any desired lower frequency. Phase modulation of the two signal vectors is achieved through the control of the delay with the modulating signal. The invention results in direct high output power, high frequency resolution, low phase noise, wide frequency setting ability, and fully digital ASIC implementability. It also results in superior power efficiency performance.

Table 1 shows Sample timing calculations for single Vector of the present Invention.

DETAILED DESCRIPTION

Figure 1:
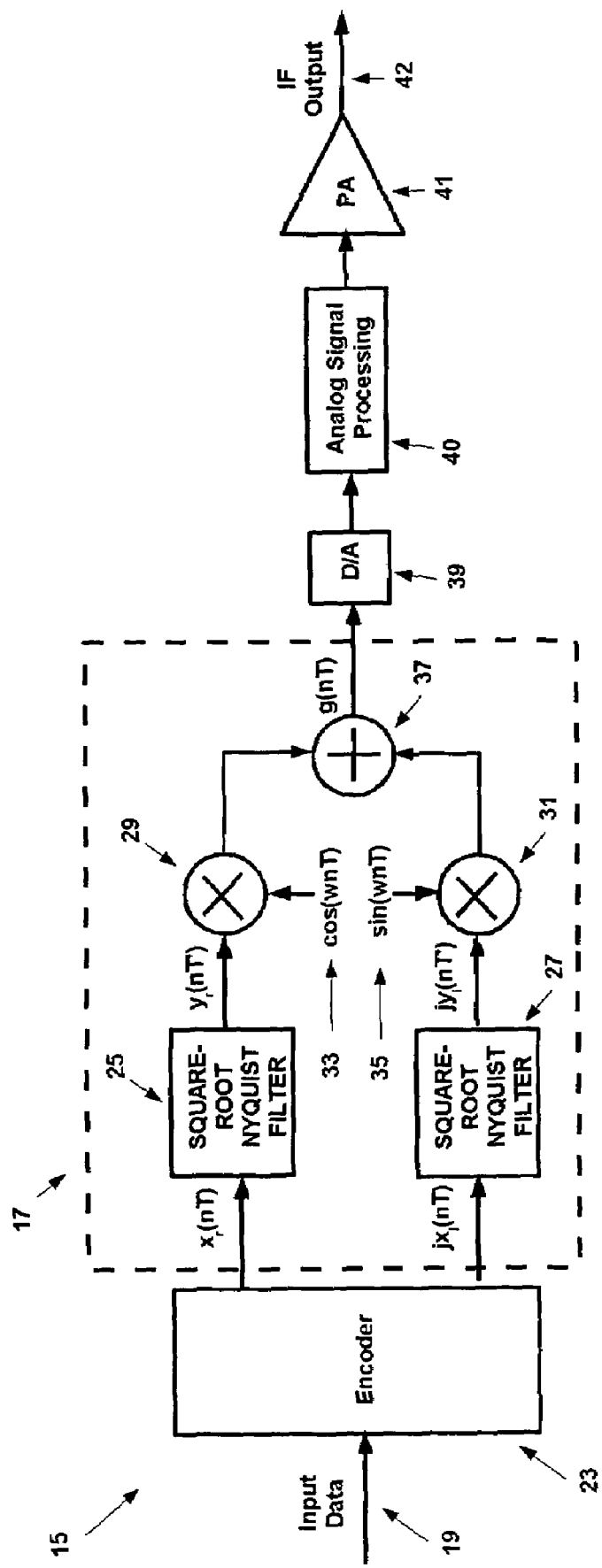
FIG. 1 is a block diagram of a Prior Art IQ QAM modulator.

A prior art, architecture 15 for a QAM modulator 17 is shown in FIG. 1. The modulator 17 accepts a digital input 19 which is fed to an encoder 23. The encoder 23 divides the incoming signal into a symbol constellation corresponding to in-phase (I) ($x_r$(nT)) and quadrature (Q) ($jx_i$(nT)) phase components while also performing forward error correction (FEC) required for subsequent decoding in the demodulator. The converter's outputs are fed to the two identical finite impulse response (FIR) square-root raised Nyquist matched filters 25, 27. These Nyquist filters 25, 27 are a pair of identical interpolating low-pass filters which receive the I ($X_r$(nT)) and Q ($jx_i$(nT)) signals from the encoder 23 and generate real and imaginary parts of the complex band-limited baseband signal. The Nyquist filters 25, 27 ameliorate intersymbol interference (ISI) which is a by-product of the amplitude modulation with constrained bandwidth. After filtering, the in-phase ($y_r$(nT')) and quadrature ($y_i$(nT')) components are multiplied 29, 31 with the IF centered carrier signals 33, 35. The multiplied signals are then summed 37 producing a band limited IF QAM output signal (g(nT)). The digital signal is then converted to an analog signal using a D/A converter 39. The analogue signal is processed 40 and fed to a linear power amplifier 41 for amplification and transmission at 42. Due to the limited frequency range of the D/A converter 39, the analog signal processing 40 may also contain upconversion to convert the IF frequency from the D/A output 39 to an RF frequency signal. This method requires a large, very linear power amplifier as the modulation must be produced at low power. This consequently results in very poor power efficiency.

Figure 2:
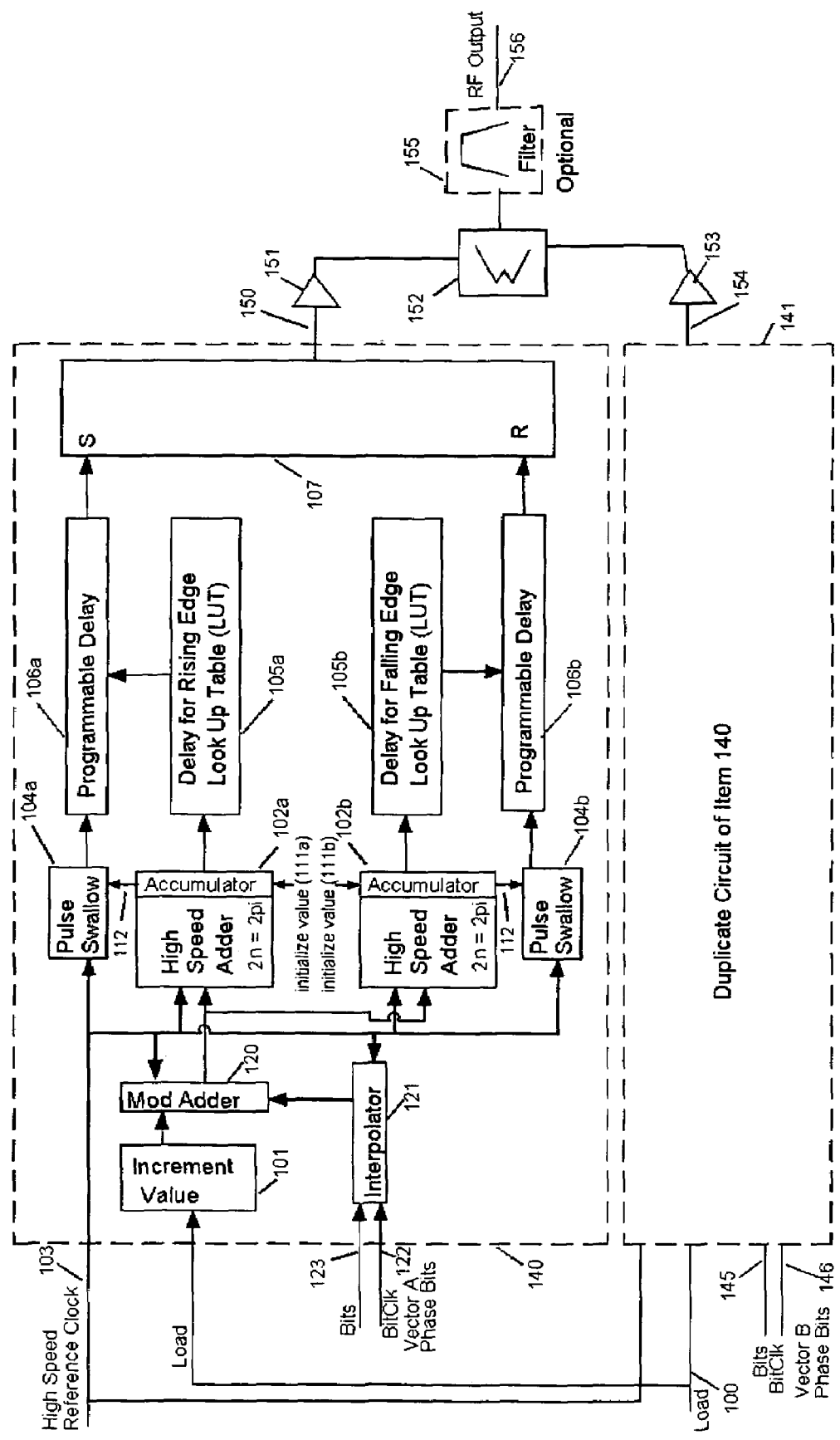
FIG. 2 is a block diagram of a System for QAM RF signal synthesis according to the present invention.
Figure 3:
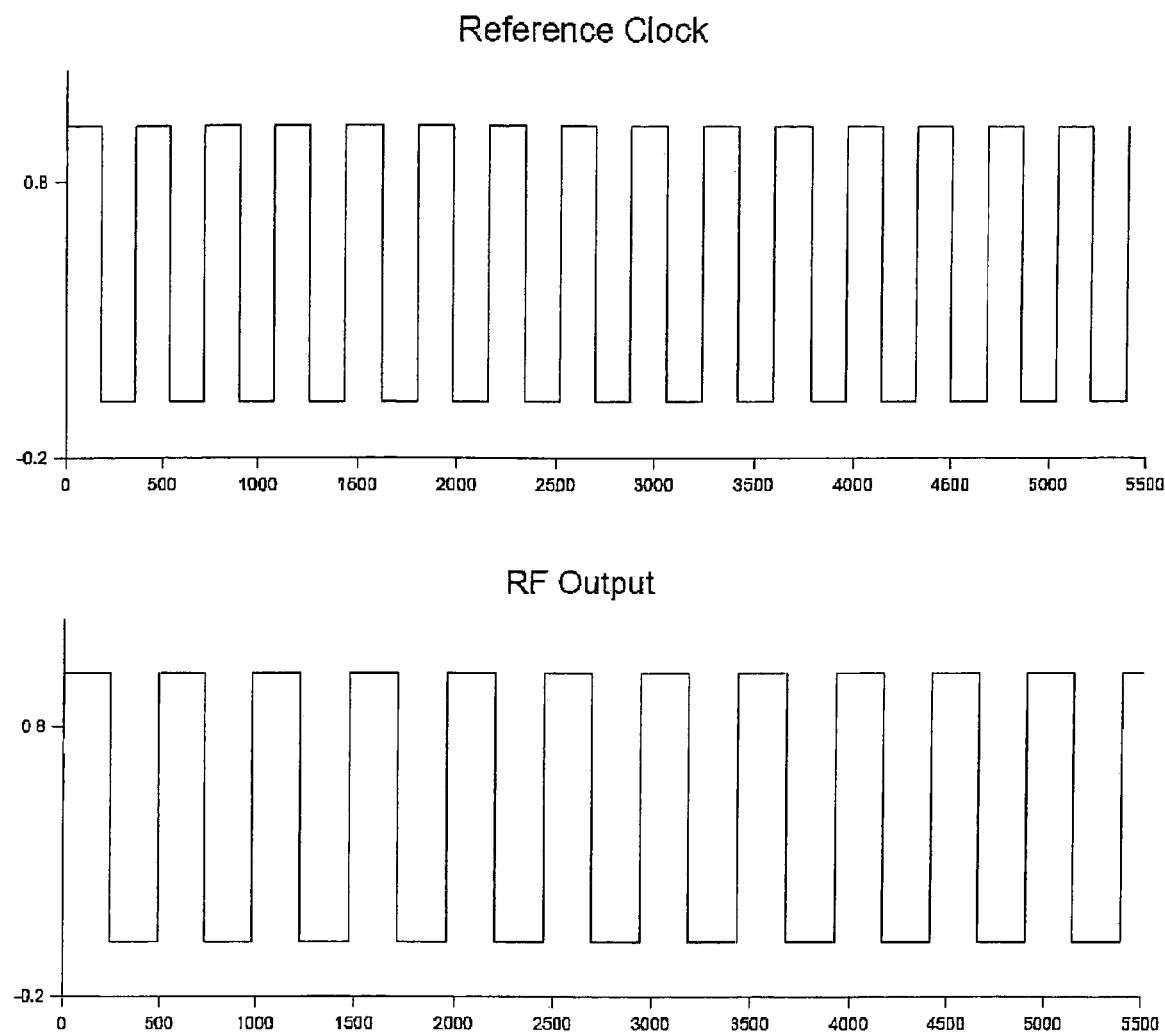
FIG. 3 is a Timing diagram for the Sample shown in Table 1.

The present device is arranged to synthesize a direct QAM modulated signal digitally. This is achieved by summing two digitally produced phase modulated vectors which together implement the required phase and amplitude modulation for the QAM signal. The amplitude modulation is only generated at the last step so that all previous functions are handled in the digital domain. Therefore, the amplification of each vector can be done by a non linear and very efficient amplifier as each vector has only phase modulation and no amplitude modulation. Further, each modulated vector is produced with high resolution from a fixed-frequency high speed reference clock. FIG. 2 presents a block diagram of the invention. The high speed reference clock 103 would typically be an external input with high frequency absolute accuracy and very low phase noise performance. Examples of sources are well known in the art and include high frequency crystal oscillators, SAW oscillators, and crystal oscillators with harmonic multiplication.

The device delays an edge of the reference clock by an amount which is controlled by the modulation adder 102a, 102b and implemented by the programmable delay 106a, 106b. The reference edge could be either the rising or falling edge of the reference clock. There are separate circuits for the control of the two edges so that the rising and falling edge of the output signal 150 can be independently controlled. This ensures that even if the duty cycle of the input reference is not 50%, the output 150 duty cycle can be controlled as both the rising edge and falling edge delay is triggered from the same edge of the reference clock 103. The desired output duty cycle is typically 50% to maximize the RF power in the fundamental frequency but any desired duty cycle can be achieved. Duty cycle is controlled by selling the initial value 114a, 111b. The frequency of the RF output is selected by loading the increment value 100. The operation is controlled by two equations. The first equation controls the RF output frequency and it determines the value to be loaded in the increment value register 101. Given that the high speed adder/accumulator 102a, 102b is comprised of $2^n$ bits, where n is the number of bits in the accumulator math, the increment value 101 is given by the following equation:

$$\text{Increment Value} = ((f_{ref}/f_{out}) - 1) * 2^n$$

where $f_{ref}$=Reference clock (103) frequency
$f_{out}$=Output (110) frequency
n=Number of bits in the accumulator math.

Table 1 shows sample calculations for an example where the high speed reference clock 103 is 1000 MHz and the desired output RF frequency is 734.313739 MHz. A value of n=12 with 12 for 12 bit adding operations is used. Using these numbers in the frequency setting equation yields an increment value 101 of 1482. This increment value is added on each clock cycle to the accumulator to produce a new accumulator value.

Figure 6:
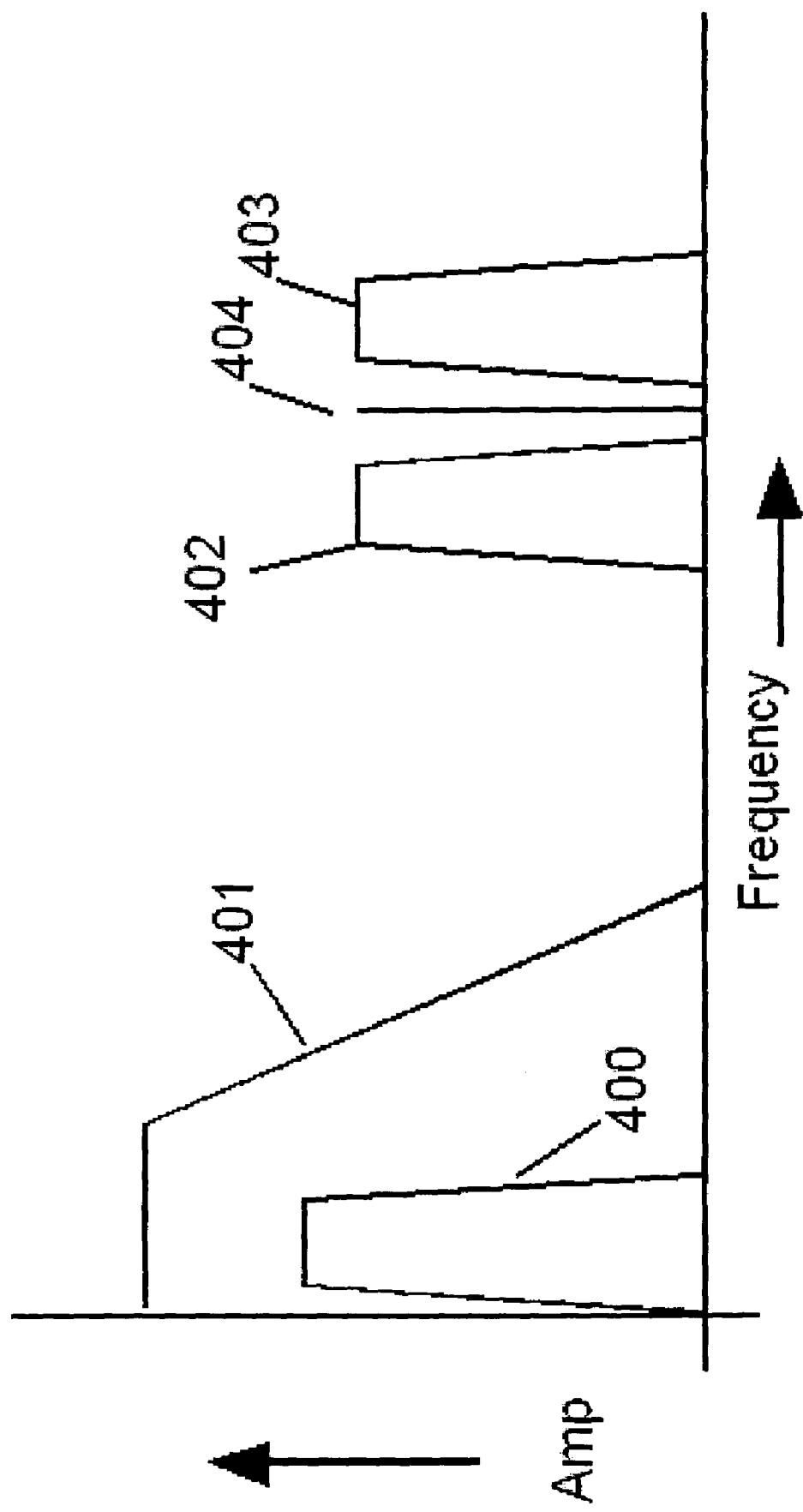
FIG. 6 is a graph showing a Sampled Baseband Frequency Spectrum the system of FIG. 2.

The second equation controls the duty cycle of the output. As shown in FIG. 2, there are separate blocks to control the rising edge delay (a) and the falling edge delay (b). To accomplish a fixed duty cycle, the increment values 101 must be the same and the initial start up values 111a and 111b in the accumulator must be set to provide for the desired fixed delay between them. The equation for the initializing value 111b assuming the initializing value for 111a to be zero is as follows:

$$\text{Initializing Value (111b assuming 111a is 0)} = (f_{ref}/f_{out}) * 2^n * (p/100)$$

where $f_{ref}$=Reference clock 103 frequency
$f_{out}$=Output 110 frequency
n=Number of bits in the accumulator math
p=Percentage duty cycle For the example shown in Table 1, for duty cycle p=50%, the initializing value 111b is calculated to be 2789. Table 1 illustrates that the adder/accumulator 102a starts at 0 and increments 1482 at every rising edge of the clock. At the same time adder/accumulator 102b starts at 2789 and increments 1482 every rising edge of the clock. Any phase modulation required is added in a second modulation adder 120. When the modulation adder 120 overflows and produces a carry out due to the math addition, an input pulse edge must be ignored or "swallowed". This corresponds to phase wraparound, i.e. the phase shift has reached 360 degrees and must be set to 0 degrees. In the present invention, $2^n$ is calibrated to equal 360 degrees of the reference clock input 103. This calibration is performed in the LUT 105a, 105b by a simple mapping of input control bits to desired control lines. The filling of the LUT 105a, 105b to perform this requirement would be well understood by those skilled in the art. The LUTs 105a, 105b can be implemented using a read only memory or with a microprocessor. The adder/accumulator overflows due to an addition indicates a greater than 360 degree delay requirement. This delay is implemented by using the next clock edge rather than delaying from the original clock edge. This allows the programmable delay line 106a, 106b to act as a delay line with endless delay capability. For example if the accumulator is using 12 bit math then 360 degrees is equal to $2^{12}$ or 4096. In the example shown in Table 1, the accumulator overflows to 4446, which means the overflow bits are set to a value of 1 and accumulator value goes to 4446-4096=350. The circuit implements the requirement for this value of phase delay in two parts. It activates the pulse swallow circuit to ignore one clock edge, and sets the programmable delay to 350 which completes the rest of the delay requirement. This unique feature of the present invention means that any quantity of overflow bits could be handled. lithe addition of the increment value 101 to the accumulator value 102a, 102b causes, for example, two overflow bits, then the pulse swallow circuit 104a, 104b at the output 112 of the accumulator 102a, 102b would ignore or "swallow" 2 pulses. In this way it is possible to synthesis very low frequencies from the high speed clock reference 103. The delay required to achieve this is limited to one cycle at the high speed reference clock rate. Furthermore, the accuracy of the timing and jitter is excellent, as the time is always relative to the closest edge of the high speed clock reference 103. The output signal phase noise is not controlled by the loop bandwidth nor the phase noise characteristics of the voltage controlled oscillators applied in traditional methods. Instead, the phase noise performance is directly linked to the high speed reference. This reduces both the jitter and phase noise of the synthesized RF output. The delayed edge from the programmable delay 106a sets the output RF high by enabling a set-reset flipflop 107. When the delayed edge from the programmable delay 106b reaches the flipflop, it resets the flip flop 107 and causes the RF output to go low. This completes the synthesis of the RF output at the preferred 50% duty cycle rate. FIG. 6 illustrates time plots for the example in Table 1. The upper plot is the high speed reference clock plotted over 5500 degrees. The lower plot is the RF output, plotted over that same 5500 degrees of phase shift with respect to the reference clock. The lower plot demonstrated the synthesis of a lower frequency from the high speed reference clock.

The frequency step size of this invention depends on the frequency and the number of bits n in the accumulator math. It is coarser at frequencies closer to the reference clock frequency, and finer at lower frequency outputs. The worst case step size is the reference frequency divided by $2^n$ where n is equal to the number of bits in the accumulator math. In the example of Table 1, the step size is 1000 MHz divided by $2^n$. This gives a step size of approximately 244 kHz. To improve the frequency resolution an increased number of bits in the math can be used. For example with 16 bit math, the frequency resolution improves to approximately 15.2 kHz. Increasing n to 32 bits would result in approximately 0.2Hz frequency resolution. It is only necessary to increase the number of bits of resolution in the adder/accumulators 102a, 102b, and not necessarily the LUTs 105a, 105b and the programmable dividers 106a, 106b. The remaining least significant bits can be truncated before the LUTs 105a, 105b with negligible effect on the RF output phase noise quality. This means that very fine frequency resolution is achieved with negligible degradation in the phase noise. It can also be seen that the increment values 101 can be changed to provide an essentially instantaneous frequency change.

Figure 4:
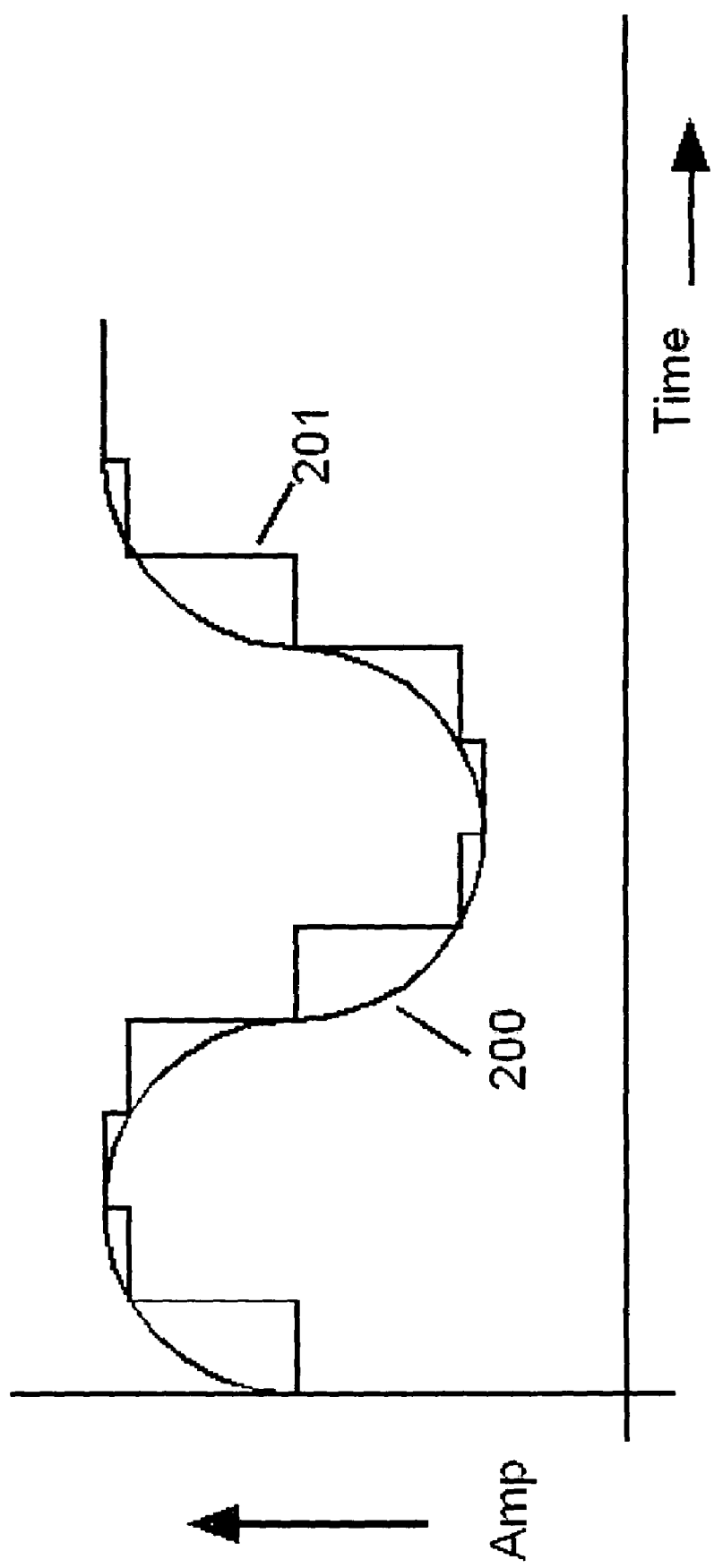
FIG. 4 is a graph showing a Sampled Baseband Spectrum in the system of FIG. 2.
Figure 5:
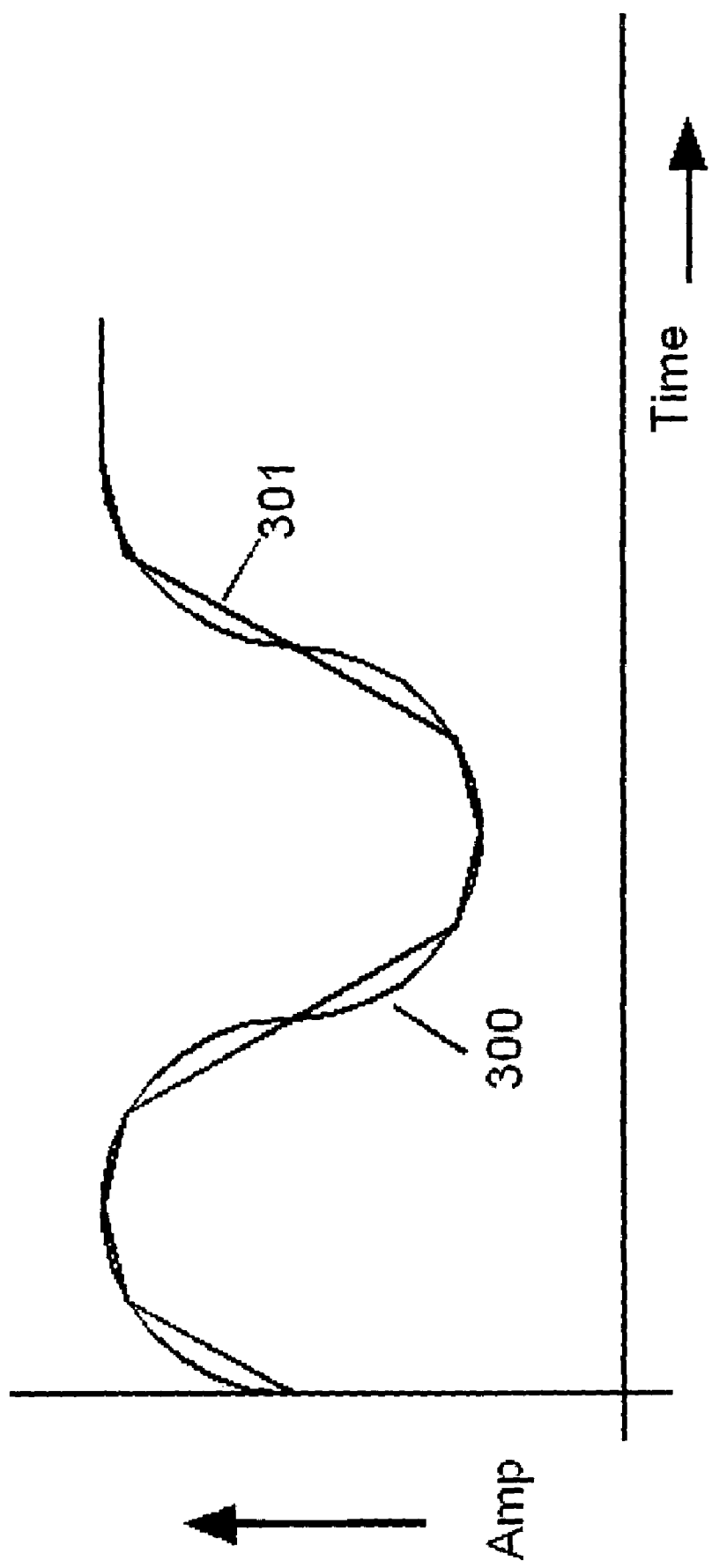
FIG. 5 is a graph showing a Linearly Interpolated Baseband Spectrum the system of FIG. 2.

Phase modulation is added by the addition of a second adder 120. This adder is also high speed and runs at full rate. This modulation adder 120 adds the desired phase offset to the value of the accumulator 102a, 102b to provide a new increment value that is sent to the look up tables 105a, 105b and the pulse swallow circuit 104a, 104b. The number added could be positive or negative. The average value added is always zero over a long period of time. This ensures the overall effect of the modulation adder is only a phase modulation and not a change in the center frequency of operation. Compared to the reference clock frequency, the modulation information (122,123) is at a much lower frequency baseband rate. FIG. 4 illustrates an example of the incoming sampled baseband using 8 samples per symbol. Graph 200 is the desired phase rate signal control. Graph 201 is the sampled input. If the graph 201 is placed through a reconstruction filter the desired shape 200 will be produced. This is illustrated in spectrum plot of FIG. 6. The energy of the sampled waveform 201 is spread over the desired baseband 400 and the clock 404 and aliasing components 402 and 403. A low pass filter 401 is used in prior art, after a DAC to remove the undesired clock 404 and aliasing components 402 and 403. However, in the present invention there is no DAC as the phase modulation is achieved by directly adding digitally to the increment value. There is no place to put an analog low pass filter. This would result in clock and aliasing signal components showing up in the RF output 150. To overcome this problem an interpolator 121 is used to reduce the clock and aliasing signals as well as to shift their frequency so that they may be filtered at the RF output 150 using an optional band bass filter 109. The preferred embodiment of the interpolator is a linear interpolator. However, it is also valid to use other interpolation techniques such as (sin x)/x interpolation and filtering. Sin x/x interpolation is well understood by those knowledgeable in the art. Linear interpolation is implemented by drawing a straight line between two known points. This is simple to implement as the increment value required for each reference clock cycle is based on the equation: Input sample frequency 122 divided by the clock reference frequency 103 multiplied by the difference of two adjacent sampled data point values. An implementation of the interpolator 121 used for suppressing the clock and aliasing components is shown in FIG. 5. The linear interpolated curve 301 now has more power in the desired curve 300 than the non interpolated curve 201. A full (sin x)/x interpolater would remove the clock and aliasing component as the phase adjust would occur at every reference clock edge. This alleviates the need for any reconstruction filter which is now replaced with a full digital solution that can be implemented using an ASIC. p Another advantage of the present device is that the output signal frequency 150 range is very wide. The pulse swallow 104a, 104b circuit can block multiple reference clock pulses extending the programmable delay indefinitely. This is only limited by the number of overflow bits and math bits used. The output frequency range coverage can thus be from DC up to the high speed reference clock frequency. It is desirable to have as high a reference clock frequency as possible. A higher reference clock frequency extends the useful frequency range, and improves the frequency resolution. The upper reference frequency limit of the design is mostly limited by the design speeds of the high speed adders/accumulator 102a, 102b and look up tables 105a, 105b. It is understood in the art that speeds can be increased by parallel processing and other design techniques. For example multiple high speed adders/accumulator, LUTs or programmable delay lines could be used in parallel for increasing the speed and hence the output signal frequency capability of the invention.

The two synthesized RF signals 150 and 154 can be phase modulated independently. The first vector circuit 140 is phase modulated from the bit control inputs of 123 and 122. The second vector circuit 141 is phase modulated from the bit control inputs of 145 and 146. These two vector circuits 140 and 141 share the same high speed reference clock 103, and frequency load increment value (100). The circuits of 140 and 141 are digital circuits with digital input and outputs. If required, these digital signals can be amplified with 151 and 153 to increase the level of each phase modulated vector. Each vector is still digital and contains no amplitude modulation, so amplification can be done with a non linear, very power efficient amplifiers (151 and 153), such as a class C amplifier. The output of the amplifiers are combined together in a combiner 152 resulting in an output that has both phase and amplitude modulation. The peak power corresponds to the sum of the two vector powers. The output of the combiner 152 may be optionally filtered 155 to remove harmonics. The result is a phase and amplitude modulated signal 156 that is controlled through the input phase control of Vector A (123, 122) and Vector B (145, 146). The modulation is valid for any level of QAM.

Within the spirit of the invention it is also possible to implement the invention on every 180 degrees of the reference clock using both the rising and the falling edges. Another alternative arrangement is to position the clock swallow circuit following the programmable delay line.

Within the spirit of the invention it is also possible to remove the adder/accumulators 102a, 102b) and replace the LUT 105a, 105b with a larger LUT. A simple counter could increment the values in the LUT. The LUT 105a, 105b would in this case hold the pre-added values, and just cycle through them until the pattern repeats.

Within the spirit of the invention is it also possible to compromise latency for the speed of the device. It does not matter how many clock cycles it takes to implement an adder or LUT for example, as long as we get valid data out every reference clock cycle.

It is possible to use a selection of different lookup tables 105a, 105b or offset values to compensate for the temperature effect on the programmable delay lines 106a, 106b. It is also possible to vary the implementation of the delay lines by altering the input clock signal. Examples of clock alteration would include frequency multiplication, division, or phase shifting.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An apparatus for directly generating a QAM RF signal comprising:
a high speed reference clock providing an input signal having a series of reference pulses at a frequency of the high speed reference clock which is higher than a desired output frequency;
two digitally controlled programmable digital delay elements each arranged to receive the reference pulses from the high speed reference clock and to generate therefrom using input data a respective one of two fixed amplitude output digital vectors; and
a signal combining element for receiving the fixed amplitude output digital vectors from the two digitally controlled programmable digital delay elements and for generating the QAM RF signal therefrom which signal is amplitude and phase modulated and in which the desired output frequency is determined by an increment value.

2. The apparatus according to claim 1 wherein the two digitally controlled programmable digital delay elements comprise high speed adders/accumulators wherein said high speed adders/accumulators are arranged to determine an amount of delay implemented by the two digitally controlled delay elements on the high speed reference clock.

3. The apparatus according to claim 2 wherein said adders/accumulators are arranged to determine the amount of delay implemented by the delay elements on the reference edge to produce the desired RF frequency.

4. The apparatus according to claim 2 wherein the programmable digital delay elements are arranged such that the worst case frequency resolution is determined by the equation: The reference frequency divided by $2^n$ where n is equal to the number of bits in the accumulator.

5. The apparatus according to claim 2 wherein the programmable digital delay elements are arranged such that increasing the number of bits in the adder math increases the frequency resolution with negligible degradation in the phase noise performance.

6. The apparatus according to claim 2 wherein the programmable digital delay elements are arranged such that the number of bits of math used in the adder can be equal to or exceed the number of bits of control in lookup table and/or the programmable delay.

7. The apparatus according to claim 2 wherein the programmable digital delay elements include parallel processing in the adders and/or accumulators to increase the speed.

8. The apparatus according to claim 2 wherein the programmable digital delay elements are arranged such that the adders/accumulators are implemented in a lookup table containing data which is precomputed and stored.

9. The apparatus according to claim 1 wherein said reference clock is an external input with high frequency absolute accuracy and very low phase noise performance.

10. The apparatus according to claim 1 wherein said delay elements delay a reference edge of the input reference clock.

11. The apparatus according to claim 10 wherein said reference edge of the input reference clock may be either the rising or falling edge of the reference clock.

12. The apparatus according to claim 11 wherein said increment values for the rising and falling edges are the same value.

13. The apparatus according to claim 1 wherein said delay elements have separate controls for producing the rising and falling edges of the output from the same input edge of the reference clock.

14. The apparatus according to claim 1 wherein implementation of the delay elements may vary by altering the input clock signal.

15. The apparatus according to claim 1 wherein said programmable digital delay elements include modulation adders which add in the positive or negative phase offset to the accumulator value to produce the required modulation.

16. The apparatus according to claim 1 wherein there is provided an interpolator which interpolates the input data in the form of base band modulated information.

17. The apparatus according to claim 16 wherein the interpolator is a linear interpolator or a (sin x)/x interpolator filter.

18. The apparatus according to claim 16 wherein the interpolator effects interpolation up to the reference clock rate so as to avoid use of a reconstruction filter.

19. The apparatus according to claim 1 wherein there are provided separate interpolators for both the rising and falling pulse edges.

20. The apparatus according to claim 1 wherein there is provided a pulse swallow circuit which is arranged to ignore/block multiple reference clock pulses.

21. The apparatus according to claim 20 wherein the pulse swallow circuit is arranged such that it controlled by the carry bits (overflow bits) in order to extend the delay to multi cycles of the input reference clock.

22. The apparatus according to claim 20 wherein said pulse swallow circuit is located prior to or following the programmable delay element.

23. The apparatus according to claim 1 wherein the programmable digital delay elements are arranged such that 360 degrees of phase delay of the programmable delay is calibrated to $2^n$ of the phase accumulator value using a look up table or microprocessor.

24. The apparatus according to claim 23 wherein the lookup table has a multiple set of lookup tables to be used for temperature compensation of the programmable delay element.

25. The apparatus according to claim 1 wherein said signal combining element comprises flipflops which are used to combine the separate rising and falling edge delays to form any desired duty cycle output.

26. The apparatus according to claim 25 wherein the programmable digital delay elements are arranged such that said duty cycle of the output is varied by changing the difference in the initialization values of the accumulators for the rising and falling edge delay control.

27. The apparatus according to claim 25 wherein the programmable digital delay elements are arranged such that said output duty cycle is not dependent on the input duty cycle.

28. The apparatus according to claim 25 wherein the two phase modulated vector outputs of the flipflops is amplified using nonlinear amplifiers.

29. The apparatus according to claim 1 wherein the components are formed fully digitally in an ASIC with no requirement for a voltage controlled oscillator, loop filter, or Digital to Analog converter.

30. The apparatus according to claim 1 wherein there is further provided amplification and filtering of the output to produce a signal that is higher in amplitude and/or having less harmonics.

31. An apparatus for directly generating a QAM RF signal comprising:
a high speed reference clock providing an input signal having a series of reference pulses at a frequency of the high speed reference clock which is higher than a desired output frequency;
two digitally controlled programmable digital delay elements each arranged to receive the reference pulses from the high speed reference clock and to generate therefrom using input data a respective one of two fixed amplitude output digital vectors; and
a signal combining element for receiving the fixed amplitude output digital vectors from the two digitally controlled programmable digital delay elements and for generating the QAM RF signal therefrom which signal is amplitude and phase modulated; wherein there are provided amplifiers for amplifying the two fixed amplitude output digital vectors non linearly before combining.

32. An apparatus for directly generating a QAM RF signal comprising:
a high speed reference clock providing an input signal having a series of reference pulses at a frequency of the high speed reference clock which is higher than a desired output frequency;
two digitally controlled programmable digital delay elements each arranged to receive the reference pulses from the high speed reference clock and to generate therefrom using input data a respective one of two fixed amplitude output digital vectors; and
a signal combining element for receiving the fixed amplitude output digital vectors from the two digitally controlled programmable digital delay elements and for generating the QAM RF signal therefrom which signal is amplitude and phase modulated;
wherein the two digitally controlled programmable digital delay elements comprise high speed adders/accumulators wherein said high speed adders/accumulators are arranged to determine an amount of delay implemented by the two digitally controlled delay elements on the high speed reference clock; and wherein an increment value is set according to the following equation:

Increment Value=$((f_{ref}/f_{out}-1)*2^n$ where $f_{ref}$=Reference clock frequency
$f_{out}$=Desired output frequency
n=Number of bits in the accumulator math.

33. Apparatus for directly generating a QAM RF signal comprising:
a high speed reference clock providing in an input signal having a series of pulses at a frequency of the reference clock which is higher than the desired output frequency;
two digitally controlled programmable digital delay elements each arranged to receive the reference pulses of the input reference clock and to generate therefrom using input data a respective one of two fixed amplitude output digital vectors;
and a signal combining element for receiving the digital vectors from the programmable digital delay elements and for generating the QAM RF signal therefrom which signal is amplitude and phase modulated;
wherein the programmable digital delay elements comprise high speed adders/accumulators wherein said adders/accumulators are arranged to determine the amount of delay implemented by the delay elements on the reference signal; and
wherein the duty cycle of the digital vectors is set by initializing the difference of the initializing values of the two accumulators according to the following equation:
The reference clock frequency divided by the desired output frequency multiplied by $2^n$ multiplied by (p/100), where p is the percentage duty cycle and n is the number of bits in the accumulator math.

* * * * *